US006751230B1

(12) United States Patent
Vogel et al.

(10) Patent No.: US 6,751,230 B1
(45) Date of Patent: Jun. 15, 2004

(54) UPSTREAM CHANNEL MULTICAST MEDIA ACCESS CONTROL (MAC) ADDRESS METHOD FOR DATA-OVER-CABLE SYSTEMS

(75) Inventors: Mark O. Vogel, Hampshire, IL (US); Ali Akgun, Evanston, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/317,775

(22) Filed: May 24, 1999

(51) Int. Cl.[7] .................... H04J 3/26
(52) U.S. Cl. .................... 370/432; 370/475
(58) Field of Search .................... 370/432, 465, 370/467, 471, 475, 478

(56) References Cited

U.S. PATENT DOCUMENTS

| | | | | | |
|---|---|---|---|---|---|
| 5,787,483 | A | * | 7/1998 | Jam et al. | 711/158 |
| 5,825,752 | A | | 10/1998 | Fujimori et al. | 370/260 |
| 5,883,901 | A | * | 3/1999 | Chiu et al. | 370/508 |
| 5,963,557 | A | * | 10/1999 | Eng | 370/432 |
| 6,049,826 | A | * | 4/2000 | Beser | 709/222 |
| 6,170,061 | B1 | * | 1/2001 | Beser | 713/201 |
| 6,546,017 | B1 | * | 4/2003 | Khaunte | 370/412 |
| 6,577,642 | B1 | * | 6/2003 | Fijolek et al. | 370/465 |

OTHER PUBLICATIONS

Data–Over–Cable–Service Interface Specifications (DOCSIS)—Radio Frequency Interface Specification Interim Specification SP–RFI–104–980724, Jul. 24, 1998, issued by Cable Television Laboratories, Inc.

Douglas E. Comer, Internetworking with TCP/IP, vol. 1, Principles Protocols and Architecture, Prentice–Hall (pp. 289–302) (1995).

* cited by examiner

*Primary Examiner*—Alpus H. Hsu
*Assistant Examiner*—Toan Nguyen
(74) *Attorney, Agent, or Firm*—McDonnell Boehnen Hulbert & Berghoff LLP

(57) ABSTRACT

A head-end in a data-over-cable system transmits a multicast message in a downstream channel to all the cable modems in a particular MAC layer. The message includes an address field that contains an upstream channel multicast MAC address that identifies a particular channel, and is used to send a multicast message for which only cable modems transmitting in the upstream direction in that channel are to respond. When the message is received by the cable modems, the cable modems compare the upstream channel multicast MAC address with addresses stored in a memory. If a match is found, indicating that the cable modem happens to transmit in the upstream direction in the particular channel, it processes the message. If no match is found, the message is discarded. The upstream channel multicast MAC address helps noise avoidance or redundancy problems associated with a particular channel to be quickly remedied, and avoids the head-end from having to send out a large number of unicast messages in order to communicate with all the modems sharing a given upstream channel.

15 Claims, 2 Drawing Sheets

DISTRIBUTION HUB OR "HEAD-END" 18 16 PSTN TRAC 49 OPERATIONS SUPPORT SYSTEM 38 O/E NODE 12 20 34 COMB. 40 FIBER COAX 28 CPE BACKBONE NETWORK WAN SWITCH/ ROUTER CMTS NET. TERM MOD. DEMOD TX RX O/E NODE CABLE MODEM 32 SPLITTER & FILTER BANK 24 26 48 10 LOCAL SERVER FACILITY 46 30 36 44 42 22 PSTN 14 DOWNSTREAM UPSTREAM

DISTRIBUTION HUB OR "HEAD-END"
16
18
CPE
14
CABLE MODEM
28
COAX
26
48
PSTN
O/E NODE
24
O/E NODE
FIBER
22
DOWNSTREAM
UPSTREAM
TX
40
RX
42
COMB.
38
SPLITTER & FILTER BANK
44
34
36
MOD.
DEMOD
30
CMTS
NET. TERM
46
OPERATIONS SUPPORT SYSTEM
TRAC
49
SWITCH/ ROUTER
20
32
LOCAL SERVER FACILITY
WAN
PSTN
BACKBONE NETWORK
12
10

UPSTREAM CHANNEL MULTICAST MEDIA ACCESS CONTROL (MAC) ADDRESS METHOD FOR DATA-OVER-CABLE SYSTEMS

BACKGROUND OF THE INVENTION

A. Field of the Invention

This invention relates to the field of data communication and data-over-cable systems. More particularly, the invention relates to a method of broadcasting a message from a head-end or cable modem termination system of a data-over-cable system to a plurality of remotely located cable modems which happen to share a common channel in an upstream direction.

B. Description of Related Art

Cable modem systems for wide area network access, e.g., Internet access, are now being rolled out in selected metropolitan areas of the United States. Basically, these systems provide high-speed data communications over a cable television infrastructure. Background information related to cable modem systems in general is described in the Data-Over-Cable Service Interface Specifications (DOCSIS)—Radio Frequency Interface Specifications, Interim Draft, dated Jul. 24, 1998, issued by Cable Television Laboratories, Inc. This document, known to persons working in the art, is incorporated by reference herein in its entirety.

The basic overall architecture of a data over cable system is shown in FIG. 1. The system of FIG. 1 provides a mechanism by which a computer 10 connected to a backbone network 12 (either directly or indirectly by intermediate networks) may communicate with another computer 14 via a cable television infrastructure indicated generally by reference numeral 16. The cable television infrastructure 16 includes a distribution hub or "head-end" 18 that is connected to the backbone network 12 via a wide area network and a switch or router 20. A cable system head-end is a central location in the cable television network that is responsible for sending cable signals in the downstream direction. The head-end 18 modulates digital data into analog form and supplies analog signals to a fiber network 22, which is connected to a plurality of O/E nodes 24. The O/E nodes 24 convert optical signals in the fiber network 22 to electrical signals for transmission over a coax cable network 26 to a cable modem 28 at the customer's location. The cable modem 28 demodulates the analog signals and extracts the digital data and supplies the data to the customer promises equipment 14, which, in a typical situation, is a general purpose computer in a home environment.

The head-end 18 includes a cable modem termination system or CMTS 30. This device provides a network side interface to a wide area network, indicated at 32, and an RF interface between the cable modem termination system and the cable network in both the downstream and upstream directions, indicated at 34 and 36. The term "downstream", as used in the present document, refers to transmission in the direction from the head-end 18 or cable modem termination system 30 to the cable modem 28 at the customer premises. The term "upstream" refers to transmission in the direction from the cable modem 28 at the customer premises to the cable modem termination system 30.

For transmission in the downstream direction, the CMTS 30 supplies data from the computer 10 to a modulation circuit MOD and to a combiner 38, where the data is combined with video signals for the cable television system. The combined signals are sent to a transmission module 40 where they are imparted onto the fiber network. In the receiving direction, data from the CPE 14 is received from the fiber network at a receive module 42, sent to a splitter and filter bank 44 and sent to a demodulation circuit DEMOD in the CMTS 30. The data is processed by a network termination unit 46, sent to the switch or router 20 and routed onto the WAN for transmission to the remote computer 10.

Many cable television networks provide only unidirectional cable systems, supporting only a "downstream" cable data path. A return data path via a telephone network (i.e., a "telephony return"), such as a public switched telephone network provided by AT&T, GTE, Sprint, MCI and others, is typically used for an "upstream" data path. A cable television system with an upstream connection to a telephony network is called a "data-over-cable system with telephony return." Such a return system is indicated at 48 where the cable modem 28 is also shown connected to the public switched telephone network (PSTN).

An exemplary data-over-cable system with telephony return includes customer premises equipment (e.g., a customer computer), a cable modem, a cable modem termination system, a to cable television network, a public switched telephone network, a telephony remote access concentrator (TRAC 49 in FIG. 1) and a data network 12 (e.g., the Internet). The cable modem termination system 30 and the telephony remote access concentrator 49 together are called a "telephony return termination system."

In a two-way cable system without telephony return, the customer premises equipment 14 sends data packets to the cable modem 28, which sends the data packets upstream via the cable television network 22 and 26 to the cable modem termination system 30. Such a system is shown in FIG. 1. The cable modem termination system 30 sends the data packets to appropriate hosts on the data network 12. The cable modem termination system 30 sends the response data packets back to the appropriate cable modem 28.

Like all network devices, cable modems filter at the hardware level based on the media access control (MAC) destination address contained in messages received at the cable modem. The MAC layer in the ISO reference model consists of the lower half of the data link layer as defined in the IEEE 802.3 standard. Generally speaking, the MAC layer contains specifications for frame formats as well as the rules for accessing the physical portions of the network. The MAC destination address is matched against addresses stored in the cable modem to determine if the message is intended for the cable modem. These addresses that are stored include the well-known broadcast, multicast and all stations addresses. For cable modems compliant with the DOCSIS specifications, the stored addresses also include the multicast MAC address of the hexadecimal form 01-E0-2F-00-00-01, which enables the addressing of all cable modems on a MAC sublayer domain.

Within this prior art addressing scheme, a message can be sent from a cable modem termination system 30 to a single cable modem (a "unicast message"), and to all the cable modems on a given MAC sublayer domain (i.e., a multicast message directed to all the cable modems in a given MAC domain), but there is no way to address a given subset of cable modems within the MAC domain. For example, there is no way to associate all cable modems on a given upstream channel with a singe multicast address. This would be a useful capability, as it would (1) conserve downstream bandwidth, (2) conserve CPU processing time in the cable modem termination system, and (3) reduce the time for the message to be acted upon, since a single multicast message could be sent quickly to a group of cable modems on an upstream channel, instead of sending a unicast message to each cable modem as would be required by prior art methods. This latter capability of sending a single multicast message to a group of cable modems on an upstream channel rather than sending a series of unicast messages to each cable modem, is critical to systems implementing redundancy or noise avoidance algorithms to facilitate increased reliability, since data links can be lost if timing or nose/power limits are exceeded. However, to the inventors knowledge, the prior art has not provided such a capability.

Thus, in a principal aspect of the invention, improvements in a data-over-cable system are described below which allow for a cable modem termination system or other point in the cable network to send a single multicast message to a group of cable modems on a given upstream channel.

SUMMARY OF THE INVENTION

In a first aspect of the invention, an improvement to a cable modem for a data-over-cable system is provided. The cable modem includes, among other things, a machine-readable storage medium, e.g., memory device, containing a set of media access control (MAC) addresses. The improvement comprises including or adding to the set of addresses stored in the cable modem an upstream channel multicast MAC address, with the upstream channel multicast MAC address associated with all cable modems transmitting in a common upstream channel in the data-over-cable system.

The upstream channel multicast MAC address could be autonomously added and updated by the cable modem each time it received a new channel assignment from the cable modem termination system. Alternatively, the upstream channel multicast MAC address could be added via a network management protocol packet such as simple network management protocol (SNMP), or through any other convenient means. The particular upstream channel multicast MAC address added to the set of addresses stored in the cable modem would correlate to the cable modem's current upstream channel assignment. Upon receipt of a new message from the cable modem termination system, the cable modem would examine the destination MAC address in the header and attempt to match it with its list of stored address. If the destination addressed matches the upstream channel multicast MAC address stored in the cable modem, then the cable modem would process the message. If no match is found, then the cable modem would discard the message.

In this manner, the ability of the cable modem termination system to send a single multicast message targeted to only those cable modems in a particular upstream channel is provided. The cable modem termination system does not have to send unicast messages to send messages to all the modems operating in a given channel. Thus, if the cable modem termination system determines that a problem or impairment is occurring in a particular upstream channel in the cable network, it can quickly and efficiently send messages to the affected modems. This allows redundancy or noise avoidance algorithms to be implemented in efficient manner, while conserving bandwidth on the downstream channel.

In one possible embodiment of the invention, the upstream channel multicast MAC address comprises a modification to one or more bytes in a media access control multicast address. The modification is a replacement of the one or more bytes of the media access control multicast address with one or more bytes identifying the upstream channel that the affected cable modems are in. For purposes of example and not limitation, the media access control multicast address for DOCSIS compliant devices takes the form 01-E0-2F-00-00-01 (hex). This multicast address could be modified to become the inventive upstream channel multicast MAC address by changing the address to either 01-E0-2F-xx-00-01 or 01-E0-2F-00-xx-01, wherein the xx byte comprises two hexadecimal characters that identify the upstream channel of interest.

In another aspect of the invention, an improvement to a cable modem termination system for a data-over-cable system is provided. The cable modem termination system sends messages to cable modems in a downstream channel in the system, with one or more of the cable modems communicating with the cable modem termination system in an upstream channel in the system. The improvement comprises providing the cable modem termination system with the ability or means for broadcasting an upstream channel multicast MAC message to a plurality of cable modems in a downstream channel of the data over cable system. The message identifies an upstream channel in the data-over-cable system and includes an upstream channel multicast MAC address that is stored in at least one of the cable modems in the downstream channel. The only cable modems that respond to the message are those cable modems that store an upstream channel multicast MAC address matching the upstream channel multicast MAC address contained in the message. As in the first aspect of the invention, the upstream channel multicast MAC address may consist of a modification to one or more bytes in a media access control multicast address.

The concept of customizing a multicast MAC message to target a specific group of cable modems could be applied to other types of addressing and identification techniques, and apply to other groups of cable modems besides those communicating in a common upstream channel, in accordance with the invention. For example, a group of cable modems in a data-over-cable network may be dedicated to status monitoring functions, may be assigned to a particular customer, may be located on a particular part of a network, or may be supplied by a certain manufacturer, or otherwise may be grouped together. The cable modem termination system sends a "group" multicast MAC message, e.g., a status inquiry message, containing a "group" multicast MAC address, that is to be responded to only by those cable modems that belong to the group. The group multicast MAC message has an address that includes a particular byte or bytes that are associated with the cable modems in the group. This address will have been previously stored by the cable modems that are in the group so that they can respond to the group multicast MAC message. When the multicast message is sent, all the cable modems that receive the message check the address with the addresses stored in memory. If a match is found the cable modem responds. If not, the message is discarded.

BRIEF DESCRIPTION OF THE DRAWINGS

In the following description of a presently preferred embodiment of the invention, reference will be made to the appended drawings, wherein like reference numbers refer to like elements in the various views, and in which.

DETAILED DESCRIPTION OF THE PREFERRED EMBODIMENT OF THE INVENTION

Figure 1:
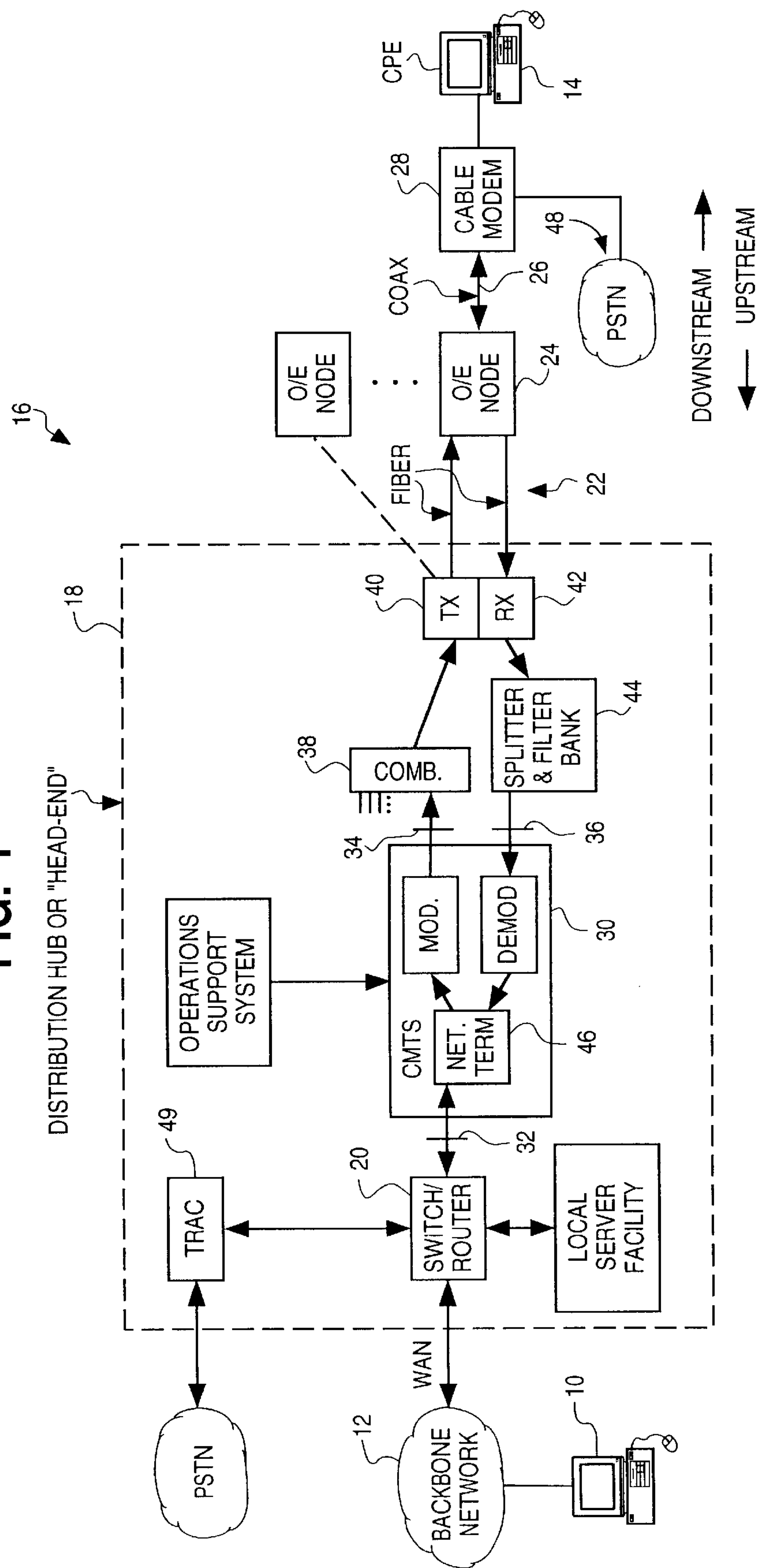
FIG. 1 is a schematic illustration showing a cable modem system of the type in which the invention may be practiced.
Figure 2:
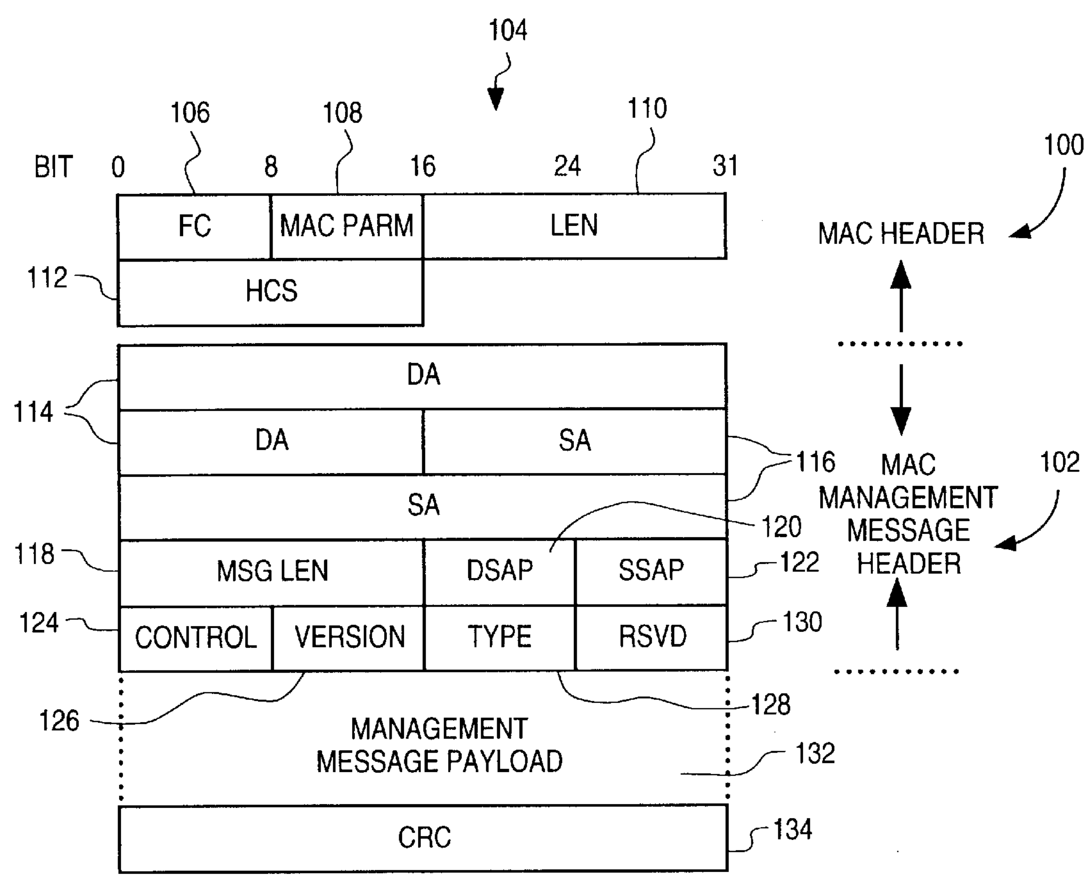
FIG. 2 is an illustration of the structure of media access control (MAC) header and MAC management message header for a data-over-cable MAC frame, with the field DA of the MAC management message header containing bit positions in which the inventive upstream channel or "group" multicast MAC address may be located in accordance with a preferred embodiment of the invention.

Referring to FIGS. 1 and 2, the structure of media access control (MAC) header 100 and MAC management message header 102 for a data-over-cable MAC frame 104 transmitted from a CMTS to a cable modem 28 is shown. The MAC header 100 includes a frame check byte field 106, a MAC_ PARM byte field 108, and length byte field LEN 110, and a header check sequence (HCS) byte field 112, the meaning and usage of which are explained in the DOCSIS RFI specification cited above at section 6.2.2 and subsequent sections. The contents of the various fields are filled in by circuitry and or software in the cable modem termination system in known manner, the details of which are not important.

The MAC management message header 102 includes a six byte destination address (DA) field 114. Ordinarily, MAC management frames are addressed to a specific cable modem unicast address, or to a multicast address for all cable modems in a particular sublayer domain, and that address is placed in the DA field 114. The multicast addresses are described in Appendix A of the DOCSIS RFI specification. As noted, this multicast address can have the form 01-E0-2F-00-00-01.

In one possible embodiment of the invention, an upstream channel multicast MAC address is used to send a single multicast MAC message to a plurality of cable modems transmitting in the upstream direction in a common channel. The upstream channel multicast address may comprise modification to one or more bytes in the media access control multicast address (inserted in field DA 114 of FIG. 2). The modification is a replacement of the one or more bytes of the media access control multicast address with one or more bytes identifying the upstream channel that the affected cable modems are in. For purposes of example and not limitation, as noted above the media access control multicast address for DOCSIS compliant devices takes the form 01-E0-2F-00-00-01. This multicast address could be modified to be the inventive upstream channel multicast MAC address by changing the address to either 01-E0-2F-xx-00-01 or 01-E0-2F-00-xx-01, wherein the xx byte comprises two hexadecimal characters that identify the upstream channel of interest for which only those cable modems that are assigned to the channel are to process and respond to the message.

The MAC management message header further includes a source address (SA) field 116, and the fields 118, 120, 122, 124, 26, 128 and 130. The fields 116–130 are described in section 6.3 of the DOCSIS RFI specification and so a discussion will be omitted. After the header, there is a variable length field 132 for a management message payload and a cyclic redundancy check (CRC) field 134.

The cable modems (reference 28 in FIG. 1) include a machine readable storage medium such as a RAM or EPROM memory containing a set of media access control (MAC) addresses. These messages will include, typically, their unicast MAC address and the MAC multicast address 01-E0-2F-00-00-01. In accordance with the invention, the memory in the cable modems will be augmented to add to the set of addresses stored in the cable modem an upstream channel multicast MAC address, such as 01-E0-2F-00-1F-01, where 1F indicates the particular upstream channel that the cable modem has been assigned. In practice, there will typically be multiple cable modems e.g., 4, 8, or even 20 or more, that will share an upstream channel between the cable modems and the CMTS 30 (FIG. 1) over the coax or fiber networks. Each of the cable modems sharing the same upstream channel 1F (hex) will store the address 01-E0-2F-00-1F-01. When any one of the given cable modems in the group changes channels, the cable modem will store a new upstream channel multicast MAC address (such as by use of a network management protocol message, e.g. SNMP, or by any other convenient means).

When the CMTS 30 wishes to send a message to all the cable modems in the upstream channel, it need only send one multicast address that will be received and processed by only those cable modems active in that upstream channel. In the present example, the CMTS will fill in the DA field 114 with the address 01-E0-2F-00-1F-01 when it wants to send a message to those cable modems transmitting in the upstream direction in the channel associated with the byte 1F. All the cable modems in the MAC layer subdomain will receive this message. They then check the address 01-E0-2F-00-1F-01 in the message with the addresses that are stored in their memory. If a match is found (that is, the cable modem is operating in the channel associated with the byte 1F) then the contents of the message is processed by the cable modem. If no match is found, then the message is discarded.

The upstream channel multicast MAC address stored in the memory of the cable modem could be autonomously added and updated by the cable modem each time it received a new channel identification from the cable modem termination system. Alternatively, the upstream channel multicast MAC address could be added via a network management protocol packet such as simple network management protocol (SNMP), or through any other convenient means. The particular upstream channel multicast MAC address added to the set of addresses stored in the cable modem would correlate to the cable modem's current upstream channel identification. Upon receipt of a new message, the cable modem would examine the destination MAC address in the header and attempt to match it with its list of stored address. If the destination addresses matches the upstream channel multicast MAC address stored in the cable modem, then the cable modem would process the message. If no match is found, then the cable modem would discard the message.

In this manner, the ability of the cable modem termination system to send a single targeted messages to only those cable modems sharing a particular upstream channel is provided. The cable modem termination system does not have to send a potentially large number of unicast messages when it wants to send a message to only those cable modems in a particular channel. Thus, if the cable modem termination system determines that a problem or impairment is occurring in a particular upstream channel in the cable network, it can quickly and efficiently send messages to the affected modems. This allows redundancy or noise avoidance algorithms to be implemented in efficient manner, while conserving bandwidth on the downstream channel.

In another aspect of the invention, the cable modem termination system 30 (FIG. 1) is provided with the ability or means for broadcasting a upstream channel multicast MAC message to a plurality of cable modems in a downstream channel of the data over cable system. The message identifies an upstream channel in the data-over-cable system and includes an upstream channel multicast MAC address that is stored in at least one of the cable modems in the downstream channel. The only cable modems that respond to the message are those cable modems that store an upstream channel multicast MAC address matching the upstream channel multicast MAC address contained in the message. As in the example described above, the upstream channel multicast MAC address may consist of a modification to one or more bytes in a media access control multicast address. The modification, in a preferred embodiment is a replacement of the one or more bytes of the media access control multicast address with one or more bytes identifying the upstream channel that are supposed to respond to the message.

The only modifications to the cable modem termination system that would be required to generate these upstream channel multicast MAC messages is a simple modification to the software running in the CMTS to define this message type, and to insert the channel identification byte into the multicast MAC address in the proper position (chosen by convention or as a matter of industry standard or agreement).

Thus, it will also be appreciated that we have described a method of sending a message to a subset of cable modems in a media access control (MAC) domain in a data-over-cable system. The method consists of the steps of:

(a) Generating an upstream channel multicast MAC address by modifying a MAC multicast address (e.g., 01-E0-2F-00-00-01). This step of modifying may comprise the step of replacing one or more bytes in the MAC multicast address with one or more bytes identifying a predetermined upstream channel in the data-over-cable system. The given upstream channel defining the subset of cable modems that are intended to respond to the message.

and (b) Transmitting the message over the data-over-cable system, with the message containing the upstream channel multicast MAC address.

All the modems in the MAC layer subdomain will receive the message but only those cable modems that have a stored address matching the upstream channel multicast MAC address will respond and process the message. For those cable modems that are assigned a different channel, they will not find a match with the address and thus will discard the message.

While a presently preferred embodiment of the invention has been described herein in conjunction with a DOCSIS compliant cable modem system, it will be appreciated that variations to the disclosed embodiment can be made without departure from the spirit and scope of the invention. For example, other addressing schemes could be used to define an upstream channel multicast MAC address between a head-end and a cable modem. The basic idea is that the cable modems and head-end use an agreed upon identification protocol such that a single multicast message is sent from the head-end that identifies an upstream channel, while only those cable modems that share the upstream channel respond to the message. For example, the preferred technique of modifying a MAC multicast address (e.g., 01-E0-2F-00-00-01) may be replaced with an entirely new upstream channel multicast MAC address that contains one or more bytes that identify the group of modems to respond to the message or identify the upstream channel for which the modems in that channel are to respond.

The concept of customizing a multicast MAC message to target a specific group of cable modems could be applied to other types of addressing and identification techniques, and apply to other groups of cable modems besides those communicating in a common upstream channel, in accordance with the invention. For example, a group of cable modems in a data-over-cable network may be dedicated to status monitoring functions, may be assigned to a particular customer, may be located on a particular part of a network, or may be supplied by a certain manufacturer, or otherwise may be grouped together. The cable modem termination system sends a "group" multicast MAC message, e.g., a status inquiry message with a "group" multicast MAC address, that is to be responded to only by those cable moderns that belong to the group. The group multicast MAC message has an address that includes a particular byte or bytes that are associated with the cable modems in the group. This address will have been previously stored by the cable modems that are in the group so that they can respond to the group multicast MAC message. When the multicast message is sent, all the cable modems that receive the message check the address with the addresses stored in memory. If a match is found the cable modem responds. If not, the message is discarded.

Instead of using a channel identification byte as a substitution in the multicast MAC address, some other modification, such as eight bit identification number, could be inserted into the multicast MAC address (or a new address defined in advance) and would be used to identify and communicate with the modems in the group. This address, referred to in the claims as a "group multicast MAC address", would be defined in advance between the CMTS and the cable modems. New members could be added to the group by downloading the address to the cable modem using SNMP or other technique. Even unrelated cable modems could be grouped together in this fashion but still accessible to the CMTS with transmission of a single multicast message.

This true spirit and scope of the invention is not limited to the preferred embodiment described herein, but rather is to be ascertained by reference to the subject matter described in the appended claims and equivalents thereof, interpreted in light of this specification.

We claim:

1. A cable modem for a data-over-cable system comprising a plurality of cable modems, said cable modem comprising a machine readable storage medium containing a set of media access control (MAC) addresses, wherein said set of addresses includes an upstream channel multicast MAC address, associated with all cable modems in an upstream channel in said data-over-cable system.

2. The cable modem of claim 1, wherein said upstream channel multicast MAC address comprises a modification to one or more bytes in a media access control multicast address, said modification comprising a replacement of said one or more bytes of said media access control multicast address with one or more bytes identifying said upstream channel.

3. A cable modem for a data-over-cable system comprising a plurality of cable modems, said cable modem comprising a machine readable storage medium containing a set of media access control (MAC) addresses, wherein said set of addresses includes an upstream channel multicast MAC address, said upstream channel multicast MAC address associated with all cable modems in an upstream channel in said data-over-cable system, wherein said upstream channel multicast MAC address comprises a modification to one or more bytes in a media access control multicast address, said modification comprising a replacement of said one or more bytes of said media access control multicast address with one or more bytes identifying said upstream channel, and wherein said upstream channel multicast MAC address comprises an address selected from the group of addresses consisting of 01-E0-2F-00-xx-01 and 01-E0-2F-xx-00-01, wherein xx comprises two hexadecimal characters identifying said upstream channel.

4. The cable modem as claimed in any one of claims 1–3, wherein said machine readable storage medium is updated with a new upstream channel multicast MAC address when said cable modem is assigned a new upstream channel.

5. In a cable modem termination system for a data over cable system, said cable modem termination system sending messages to cable modems in a downstream channel in said data over cable system, with one or more of said cable modems communicating with said cable modem termination system in an upstream channel in said data over cable system, the improvement comprising:

said cable modem termination system broadcasting a upstream channel multicast MAC message to a plurality of cable modems in a downstream channel of said data over cable system, wherein said message identifies an upstream channel in said data-over-cable system and includes an upstream channel multicast MAC address stored in at least one of said plurality of cable modems, and wherein only those cable modems in said upstream channel and storing an upstream channel multicast MAC address matching said upstream channel multicast MAC address contained in said message respond to said message.

6. The improvement of claim 5, wherein said upstream channel multicast MAC address comprises a modification to one or more bytes in a media access control multicast address, said modification comprising a replacement of said one or more bytes of said media access control multicast address with one or more bytes identifying said upstream channel.

7. In a cable modem termination system for a data over cable system, said cable modem termination system sending messages to cable modems in a downstream channel in said data over cable system, with one or more of said cable modems communicating with said cable modem termination system in an upstream channel in said data over cable system, the improvement comprising:

said cable modem termination system broadcasting a upstream channel multicast MAC message to a plurality of cable modems in a downstream channel of said data over cable system, wherein said message identifies an upstream channel in said data-over-cable system and includes an upstream channel multicast MAC address stored in at least one of said plurality of cable modems, and wherein only those cable modems in said upstream channel and storing an upstream channel multicast MAC address matching said upstream channel multicast MAC address contained in said message respond to said message, wherein said upstream channel multicast MAC address comprises a modification to one or more bytes in a media access control multicast address, said modification comprising a replacement of said one or more bytes of said media access control multicast address with one or more bytes identifying said upstream channel, and wherein said upstream channel multicast MAC address comprises an address selected from the group of addresses consisting of 01-E0-2F-00-xx-01 and 01-E0-2F-xx-00-01, wherein xx comprises two hexadecimal characters identifying said upstream channel.

8. A method of sending a message to a subset of cable modems in a media access control (MAC) domain in a data-over-cable system, comprising the steps of:

generating an upstream channel multicast MAC address by modifying a MAC multicast address, said step of modifying comprising the step of replacing one or more bytes in said MAC multicast address with one or more bytes identifying a predetermined upstream channel in said data-over-cable system with said predetermined upstream channel defining said subset of cable modems, and transmitting said message over said data-over-cable system, said message containing said upstream channel multicast MAC address.

9. A method of sending a message to a subset of cable modems in a media access control (MAC) domain in a data-over-cable system, comprising the steps of:

generating an upstream channel multicast MAC address by modifying a MAC multicast address, said step of modifying comprising the step of replacing one or more bytes in said MAC multicast address with one or more bytes identifying a predetermined upstream channel in said data-over-cable system with said predetermined upstream channel defining said subset of cable modems, and transmitting said message over said data-over-cable system, said message containing said upstream channel multicast MAC address, wherein said upstream channel multicast MAC address comprises an address selected from the group of addresses consisting of 01-E0-2F-00-xx-01 and 01-E0-2F-xx-00-01, wherein xx comprises two hexadecimal characters identifying said upstream channel.

10. A method of sending a targeted multicast message to a predetermined group of cable modems comprising a subset of a larger set of cable modems in a data-over-cable system, comprising the steps of:

generating a group multicast MAC message that includes a group multicast MAC address identified with said predetermined group of cable modems, wherein the predetermined group of cable modems includes all cable modems in a particular upstream channel in said data-over-cable system;

providing said predetermined group of cable modems with said group multicast MAC address, wherein said group multicast address is an upstream channel multicast MAC address; and transmitting said group multicast MAC message over said data-over-cable system to said larger set of cable modems;

wherein each of said cable modems in said larger set of cable modems compares said group multicast MAC address with addresses stored in a memory in said cable modems, and wherein only said predetermined group of cable modems have an address stored in memory that matches said group multicast MAC address, and therefore only said predetermined group of cable modems respond to said message.

11. A method of sending a targeted multicast message to a predetermined group of cable modems comprising a subset of a larger set of cable modems in a data-over-cable system, comprising the steps of:

generating a group multicast MAC message that includes a group multicast MAC address identified with said predetermined group of cable modems, wherein the predetermined group of cable modems includes all cable modems in a particular upstream channel in said data-over-cable system;

providing said predetermined group of cable modems with said group multicast MAC address, wherein said group multicast address is an upstream channel multicast MAC address; and transmitting said group multicast MAC message over said data-over-cable system to said larger set of cable modems;

wherein each of said cable modems in said larger set of cable modems compares said group multicast MAC address with addresses stored in a memory in said cable modems, and wherein only said predetermined group of cable modems have an address stored in memory that matches said group multicast MAC address, and therefore only said predetermined group of cable modems respond to said message, wherein said group multicast MAC address comprises a modification to a multicast MAC address of the form 01-E0-2F-00-00-01.

12. The method of claim 10, wherein said group multicast MAC address is downloaded to said predetermined group of cable modems using a simple network management protocol packet.

13. The method of claim 10, wherein said predetermine group of modems comprises a group of status monitoring cable modems.

14. The method of claim 10, wherein said predetermined group of modems comprises a group of cable modems manufactured by a common manufacturer.

15. The method of claim 10, wherein said predetermined group of cable modems comprises a group of cable modems commonly owned and operated.

* * * * *